April 3, 1928.
A. J. HOLLAND
ATTACHMENT FOR MOWERS
Filed Oct. 9, 1926
1,665,032
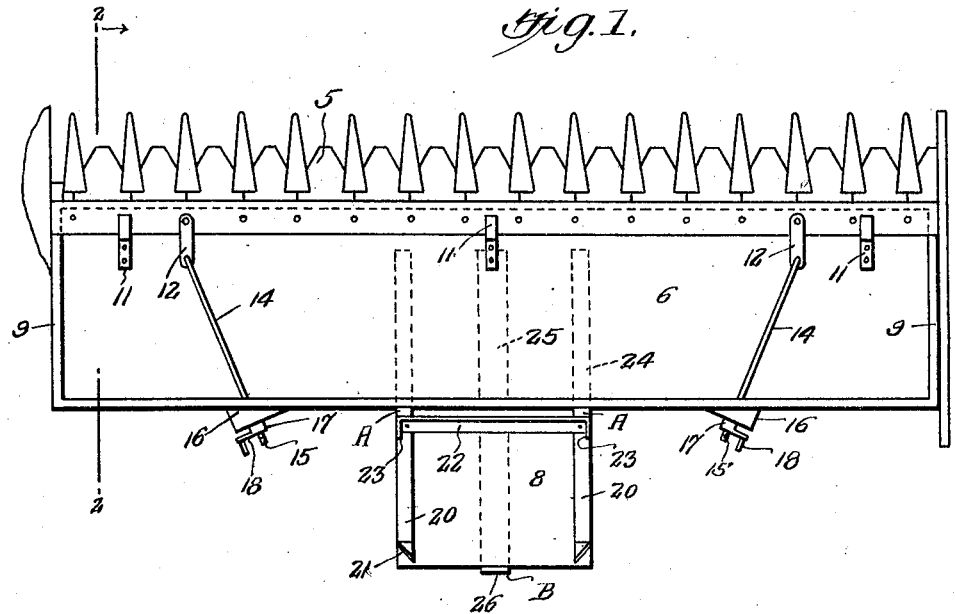
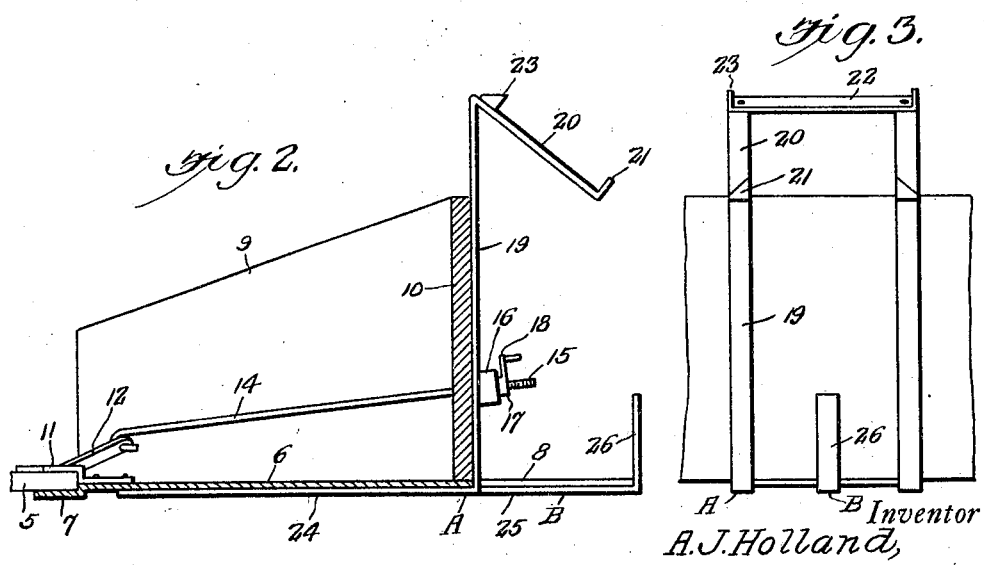
Inventor
A. J. Holland,
By Clarence A. O'Brien
Attorney Patented Apr. 3, 1928.

1,665,032

UNITED STATES PATENT OFFICE.

ANDREW J. HOLLAND, OF KING CITY, MISSOURI.

ATTACHMENT FOR MOWERS.

Application filed October 9, 1926. Serial No. 140,506.

The present invention relates to an attachment for mowers and has for its principal object to provide a structure which will save blue grass seed and the like.

Another important object of the invention lies in the provision of an attachment of this nature which may be easily and quickly assembled upon the mower.

A still further very important object of the invention lies in the provision of an attachment of this nature with an exceedingly simple construction that may be manufactured at a low cost yet will be strong and durable, thoroughly efficient and reliable in use, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:—

Figure 1 is a top plan view of the attachment mounted on the cutter bar of a mower, Fig. 2 is a vertical transverse section taken substantially on the line 2—2 of Fig. 1, Fig. 3 is a detail rear elevation of the attachment showing particularly the bag holder.

Referring to the drawing in detail it will be seen that the numeral 5 denotes generally a conventional or any preferred form of cutter bar used on mowers. My attachment includes among other elements a bottom 6 preferably constructed of sheet metal having an offset portion 7, which is of the same width as the bottom 6 and an extension 8 at its rear edge which is substantially narrower than the bottom 6 and is centrally located with respect thereto. Sides 9 rise from the bottom 6 and a back 10 rises therefrom between the sides 9. Substantially Z-shaped brackets 11 are attached to the forward edge of the bottom 6 for engaging over the cutter bar 5 as is clearly illustrated in Fig. 2. In the present instance, by way of example only, I have shown three of these brackets, one adjacent each side and one centrally situated. Links 12 are engaged with the cutter bar 5 adjacent the brackets 11 at the sides of the attachment and have engaged therewith rods 14 having threaded ends 15 projecting through blocks 16 on the back 10. These rods 14 preferably extend somewhat diagonally of the attachment as is shown in Fig. 1. Nuts 17 are threaded on the threaded ends 15 and have operating cranks 18. Thus by threading these nuts tightly on the ends 15 against the block 16 the attachment is drawn into tight engagement with the cutter bar 5. This makes the attachment to and detachment from the cutter bar easy and accurate.

A bag holder is mounted on the attachment as is clearly illustrated in the drawing and includes L-shaped bars A the vertical arms 19 of which project along the rear surface of the back 10 and terminate a distance thereabove and merge into downwardly and rearwardly inclined portions 20 the extremities of which have one corner bent upwardly to form a prong 21. A cross bar 22 extends across the upper ends of the portions 20 and has its extremities bent up to form prongs 23. The open edge of the bag is engaged on these prongs 21 and 23. The horizontal arms 24 of the L-shaped bars A project along the bottom surface of the bottom 6. The arms 19 and 24 will be attached in any suitable manner to the back 10 and the bottom 6 respectively. An L-shaped bar B includes a horizontal arm 25 which extends below the under surface of the bottom 6 between the arms 24 and projects rearwardly of the attachment for a distance to extend under the extension 8 and the vertical arm 26 rises at the rear edge of the extension 8 being much shorter than the arms 19 as clearly illustrated in Figs. 2 and 3. The bottom of the bag, of course, fits on the extension 8.

It is thought that the construction of the invention has now been clearly set forth in detail and it will be appreciated that the short blue grass seeds may be saved since they will be thrown into this attachment and then may be collected from time to time from the attachment into the bag supported by the bag holder. The device is thus very compact and convenient yet simple in its construction and thoroughly reliable and efficient in use. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention what I claim as new is:—

An attachment of the class described comprising a bottom having an offset forward edge to extend under a cutter bar of a mower, a plurality of substantially Z-shaped brackets attached to the bottom to extend over the cutter bar, sides rising from the bottom, a back rising from the bottom, links engaged with the cutter bar, rods engaged with the links, blocks in the back having openings through which said rods project, nuts threaded on the rods and having cranks so that they may be tightened against the block, an extension formed on the rear edge of the bottom to the rear of the back, a pair of L-shaped bars having their vertical arms secured to the rear surface of the back and their horizontal arms secured to the under surface of the bottom, said vertical arms projecting above the back and merging into downwardly and rearwardly inclined extensions, a third L-shaped bar having its horizontal portion extending along the under surface of the bottom and its extension, and having its vertical arm rising at the rear edge of the extension and being shorter than the first-mentioned vertical arm.

In testimony whereof I affix my signature.

ANDREW J. HOLLAND.